United States Patent [19]
Wyness

[11] Patent Number: 5,866,019
[45] Date of Patent: *Feb. 2, 1999

[54] METHOD FOR BACKWASHING FILTERS IN A WATER TREATMENT PLANT WITH CLARIFIER AND PERIPHERAL FILTER CELLS

[76] Inventor: David K. Wyness, 1624 Willemoore, Springfield, Ill. 62704

[*] Notice: The terminal 13 months of this patent has been disclaimed.

[21] Appl. No.: 456,245

[22] Filed: May 31, 1995

Related U.S. Application Data

[62] Division of Ser. No. 318,143, Oct. 5, 1994.

[51] Int. Cl.$^6$ ................................................ B01D 24/46
[52] U.S. Cl. .......................... 210/793; 210/256; 210/264; 210/265; 210/269; 210/275; 210/411
[58] Field of Search ..................................... 210/792, 793, 210/269, 275, 277, 418, 407, 411, 323.1, 332, 333.01, 256, 264, 265

[56] References Cited

U.S. PATENT DOCUMENTS

| | | |
|---|---|---|
| 2,129,181 | 9/1938 | Morse . |
| 2,878,935 | 3/1959 | Magrath et al. . |
| 2,878,939 | 3/1959 | Aldrich .................................. 210/202 |
| 2,888,144 | 5/1959 | Aldrich .................................. 210/530 |
| 2,901,114 | 8/1959 | Smith et al. . |
| 3,118,834 | 1/1964 | Southworth et al. . |
| 3,214,021 | 10/1965 | Applebaum ........................... 210/108 |
| 4,146,471 | 3/1979 | Wyness . |
| 4,464,255 | 8/1984 | Ueda ..................................... 210/136 |
| 4,629,565 | 12/1986 | Hell et al. . |
| 4,765,891 | 8/1988 | Wyness ................................. 210/207 |
| 4,790,935 | 12/1988 | Johnson ................................ 210/232 |
| 5,124,049 | 6/1992 | Manes ................................... 210/715 |
| 5,306,422 | 4/1994 | Krofta ................................... 210/151 |
| 5,320,750 | 6/1994 | Krofta ................................. 210/221.2 |

Primary Examiner—Robert Popovics
Attorney, Agent, or Firm—Marshall, O'Toole, Gerstein, Murray & Borun

[57] ABSTRACT

Apparatus for treating a liquid containing suspended solids comprising a clarifying vessel and a number of filters positioned around the periphery of the clarifying vessel for receiving and filtering liquid from the clarifier. A filter may be backwashed by isolating that filter, filling the other filter cells with clarified liquid and draining them into the isolated cell to remove filter media contaminants.

8 Claims, 4 Drawing Sheets

METHOD FOR BACKWASHING FILTERS IN A WATER TREATMENT PLANT WITH CLARIFIER AND PERIPHERAL FILTER CELLS

This is a Divisional of U.S. application Ser. No. 08/318,143, filed Oct. 5, 1994.

This invention relates generally to apparatus and methods for treating liquids in a clarifying vessel and filter that is positioned around the periphery of the clarifying vessel.

BACKGROUND OF THE INVENTION

Many liquids containing suspended solids have been treated in clarifying vessels in which the liquid flows in a upward helical path, such as disclosed in Wyness U.S. Pat. Nos. 4,146,471 and 4,765,891. Typically, clarified water from the clarifying vessel is transferred to a filtering facility in a building nearby.

Filters are space intensive and typically require a sheltering building to protect the filter integrity and finished water quality. All regulatory agencies require a minimum of two filter cells so that one cell is in service while the other is being backwashed or maintained. Backwashing of filter media is necessary when there is a loss of head in the filter or excessive turbidity of filter effluent. Filter cells typically require a backwash source, such as a backwash water storage tank, piping, and backwash pumps.

Filter cell distribution and backwash equipment can be mechanically and hydraulically complicated which can present operating and maintenance problems. Further, some filter designs are compromised by limitations on the available backwash head, such as shallow profile filters which may require an auxiliary backwash source.

Some systems are configured in a way that confines valves, piping, and mechanical and electrical components making maintenance time consuming and difficult. Underdrains for the various cells cannot be isolated so that the failure of one filter cell's underdrain requires all filter cells to be shut down for repair.

Further, individual cells cannot be filtered to waste which is an increasingly important operational procedure for surface water treatment plants. With the Safe Drinking Water Act (SWDA) and the Surface Water Treatment Rule (SWTR) regulations on turbidity, giardia cyst removal, virus removal and cryptosporidium removal, regulatory agencies are requiring that after a backwash cycle, water passing through the media and filter underdrain be sent to waste until the filtered water turbidities are below the regulatory limits. This filter-to-waste system must include an air gap to break any siphoning of waste water from the waste pipe back to the filter cells so that there is no possibility for contamination of those filter cells remaining on line.

Thus, there is a need for a filtering system that reduces space requirements, the capital costs of construction, and the operational and maintenance costs of backwashing the filtration system, while providing easy access to working components, filter cell isolation capabilities, underdrain isolation capabilities, ample backwash head and backwash water storage.

SUMMARY OF THE INVENTION

In accordance with the present invention there is provided a treatment plant for treating liquid containing suspended solids including: a walled clarifying vessel for receiving liquid flowing in an upward helical path; means for withdrawing liquid from the surface of the liquid in the clarifying vessel; a filter cell positioned at the periphery of the clarifying vessel and having means for receiving clarified liquid from the withdrawing means; a filter positioned inside of the filter cell, for filtering clarified liquid; and a filter effluent control means for receiving filtered liquid from the filter cell and for maintaining the level of liquid in the filter cell at a predetermined elevation.

The clarifying vessel may include a lower cylindrical portion; a central conical portion having a lower cross-sectional diameter smaller than its top cross-sectional diameter; and an upper cylindrical section. The liquid may be withdrawn from the clarifying vessel through an opening in a clarifying vessel wall.

The filter cell may include an inlet and an outlet with the filter positioned therebetween. Further, the filter cell may at least partially define a piping room beneath the clarifying vessel where mechanical and electrical treatment plant equipment may be located for easy maintenance access and to conserve space that would otherwise be required to house such equipment.

The treatment plant may also include: additional filter cells; means for isolating a filter cell to be backwashed; means for draining some of the remaining liquid from the filter cell to be backwashed; means for stopping the flow of filtered liquid from the filter cells remaining in service to cause the liquid level in these filter cells to rise; and means for diverting the liquid in these cells to the isolated filter cell to backwash the filter in the isolated cell.

The filter effluent control means may be used to control the level of liquid in only one or in all filter cells.

The treatment plant may also include means for recarbonating the clarified liquid while it is in the filter cell. The recarbonating contact time of the liquid in the filter cell may be controlled by the filter effluent control means to maintain the level of liquid in the filter cell at a higher elevation.

There is also provided in accordance with the present invention a method for backwashing a filter cell in a treatment plant having a central clarifying vessel, and a number of filter cells positioned around the periphery of the clarifying vessel, the method comprises the steps of: isolating the filter cell to be backwashed from the clarifying vessel; lowering the liquid level to a predetermined elevation in the isolated filter cell; stopping the flow of effluent from the other filter cells remaining in service; permitting the filter cells remaining in service to fill with liquid to a predetermined elevation; and transferring water from the filter cells in service to the isolated filter cell to backwash a filter within that filter cell; withdrawing backwashed material from the isolated filter cell; draining filtered water to waste; and returning the filter cells to normal filtering service.

The method may include closing valves to isolate the filter cell to be backwashed, and stopping the flow of effluent from the other filter cells remaining in service.

The method may include permitting the filter cells remaining in service to fill with clarified liquid from the clarifying vessel. Each filter cell may receive clarified liquid from the clarifying vessel through a dedicated helical weir. A helical weir may become submerged when the filter cell it feeds becomes full and then automatically redirect the liquid to unsubmerged helical weir openings.

DETAILED DESCRIPTION OF THE DRAWINGS

To the extent it is reasonable and practical the same or similar elements which appear in the various views of the drawings will be identified by the same numbers.

Figure 1:
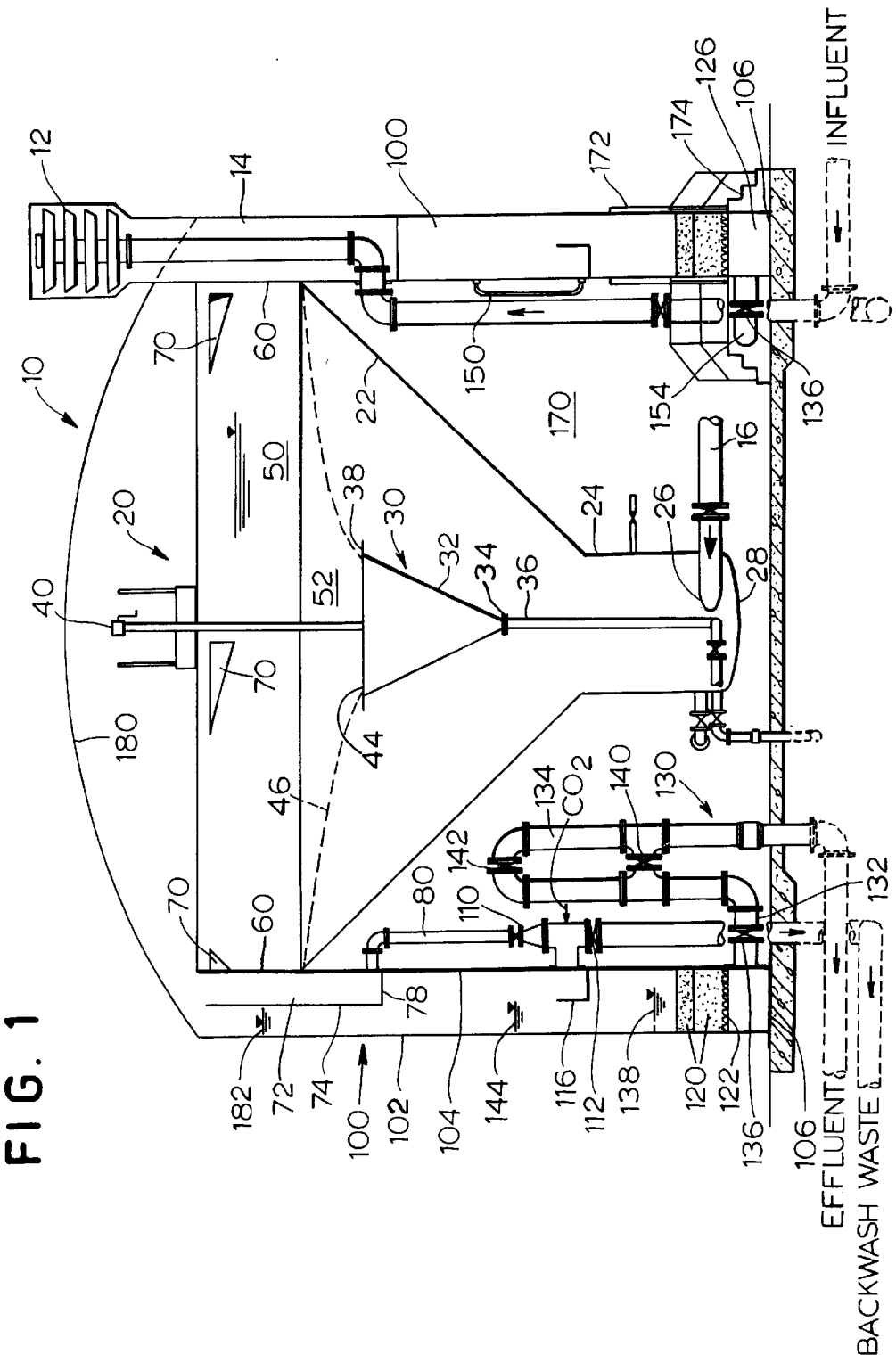
FIG. 1 is a cross-sectional elevation view of a treatment plant in accordance with the present invention.

With reference to FIG. 1, a water treatment plant 10 is shown in which water is clarified, treated, and filtered. Raw water containing dissolved or suspended solids or both enters the plant 10 and is pumped through a optional tray aerator/degasifier 12 to remove gases and is then stored temporarily in a head tank 14 which maintains a sufficient head to drive downstream components of the plant 10. Raw water is fed from the head tank 14 via a conduit 16 to a clarifying vessel 20.

The clarifying vessel 20 is shown having walls 22 in the form of a frustrum of a cone with a minimum diameter located at the bottom and with a maximum diameter located at or near the upper portion or top. Attached to the lower extremity of the cone is a cylindrical inlet chamber 24 having opposing tangential inlets 26 for receiving raw water from conduit 16. One or more additional inlets, can be provided for introducing water treatment chemicals, such as precipitating or flocculating agents. The cylindrical chamber 24 is joined at its lower edge to bottom 28.

Vessel 20 has a vertically and axially positioned downcomer 30. The downcomer 30 has an upper conical portion 32 which is joined at its lower end 34 of minimum diameter to a vertically positioned and axially located pipe or conduit 36. A substantially vertical circular flange 38 may be joined at its upper end to the upper end of conical portion 32. This flange serves as an air trap and it can also minimize floc carry-over into the clarified liquid zone.

The raw water rises in a generally helical path out of a cylindrical inlet chamber 24 into the conical section of the vessel 20. As the water rises through the conical portion 22 of the vessel 20, the cross-sectional area of the vessel increases, resulting in a corresponding decrease in the space flow rate of the treated water through the vessel, although the net flow remains constant. The space flow rate decreases until the solids are no longer carried by the drag or lift and turbulence of the water, and a point of equilibrium where the lifting force of the water and the counteracting gravitational force on the suspended solids is in equilibrium, causing a suspended rotating sludge blanket 46 of the solids to form in the vessel 20. The rotating sludge blanket 46 is suspended at or below the maximum diameter of the vessel.

Winch 40 raises and lowers the downcomer 30 to locate the downcomer mouth 44 at a position most suitable for receiving sludge from the rotating blanket 46. To enable this vertical adjustment, conduit 36 is preferably fitted with telescoping joint means (not illustrated). Winch 40 is accessible from staircase 42 (FIG. 2) and a cat walk (not illustrated).

The water, of course, continues to flow vertically through the rotating sludge blanket 46, leaving most of the suspended solids behind but forming a layer of water 50 above blanket 46. The water layer 50 contains some suspended particles and additional particles or flocs can form by reaction with treatment chemicals in the water. These solids ultimately move into the quiescent zone 52 and are removed through mouth 44 of the downcomer and out of the plant 10 to appropriate sludge treatment facilities. It is important to avoid removing suspended solids with clarified water withdrawn from water layer 50. The upper part of vessel 20 facilitates further water clarification and removal of the clarified water while maintaining solids in the vessel for removal through the downcomer 30.

Vessel 20 includes a vertical cylindrical weir wall 60 extending upwardly from the top of conical portion 22 to form a weir. A number of helical weirs 70 are located along the inner surface of the weir wall 60. A water drop box 72 is located along the outer surface of the weir wall 60. The drop box 72 is defined by the weir wall 60, an outer vertical wall 74, and a bottom 78. Near the bottom of the drop box 72 is an opening to a filter influent conduit 80 for receiving clarified water from the drop box 72.

As water 50 above the sludge blanket 46 flows clockwise in the clarifying vessel of FIG. 2, the outer peripheral flow contacts the helical weirs 70, which can be positioned to be partially above and partially below the water level surface and even totally below the water surface. The helical weirs 70 direct solids in the water away from the weir wall 60 and radially inward thereby forming a stream of clarified water along the weir wall 60. The clarified water then spills over the helical weirs 70, into the drop box 72, and into filter influent conduit 80. This and other clarifier vessel and helical weir arrangements are described and illustrated in U.S. Pat. Nos. 4,765,891 and 4,146,471.

Figure 2:
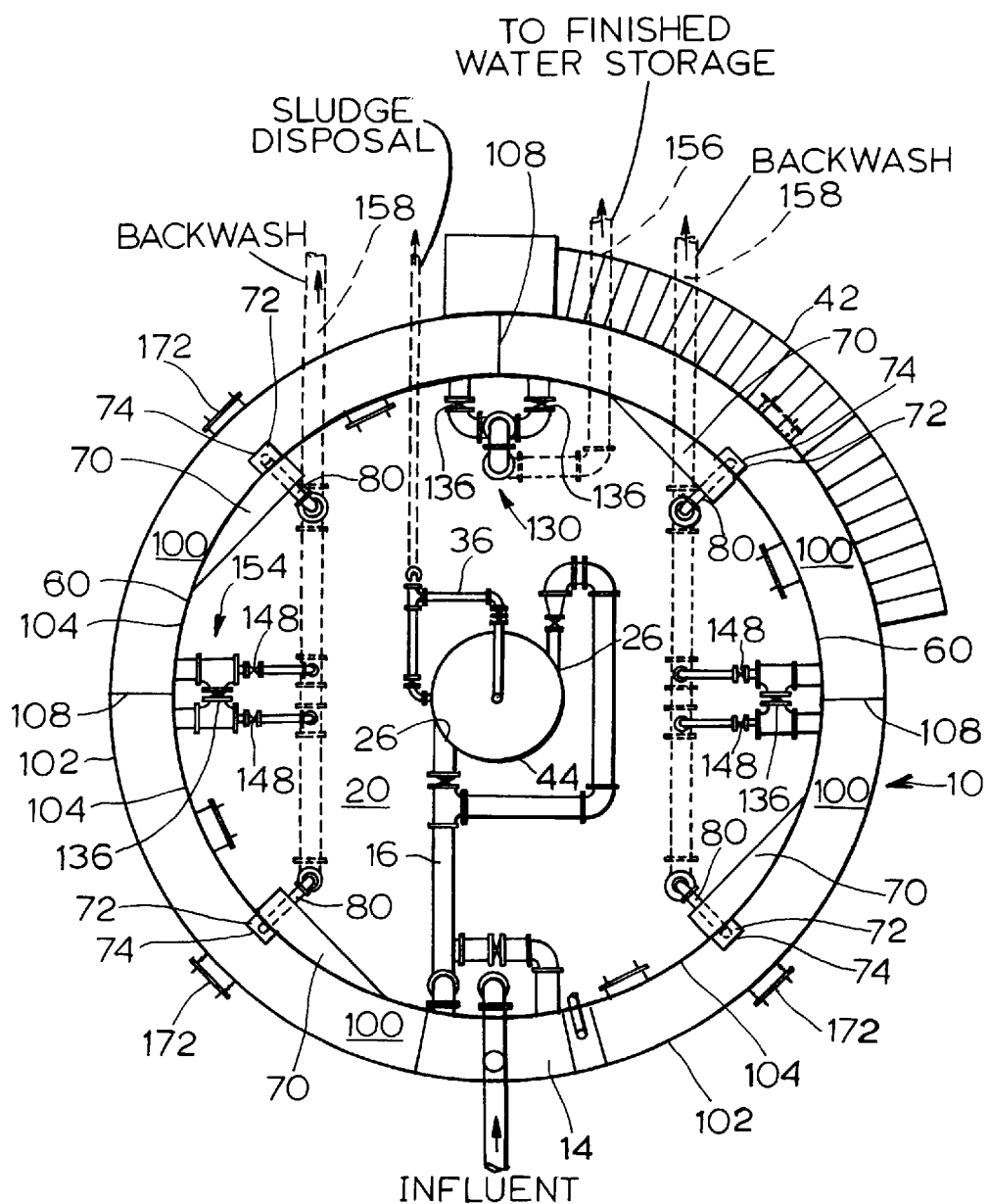
FIG. 2 is a plan view of the treatment plant of FIG. 1.

As illustrated in FIGS. 1 and 2 a filter cell 100 is positioned at the outer periphery of clarifying vessel 20 and is defined by an outer vertical wall 102, an inner vertical wall 104, and a bottom 106. As seen in FIG. 2 there are four substantially identical filter cells positioned around the entire perimeter of vessel 20 and are separated by vertical radial walls 108. Clarified water flows through filter influent conduit 80, through a normally open filter influent control valve 110, and into the filter cell 100 because backwash waste valve 112 is normally closed. During the backwashing procedure described below, the backwash waste valve 112 is opened when the filter cell 100 is being backwashed to remove filter contaminants.

Once inside the filter cell 100, water flows up and over a trough 116 to reduce turbulence that might disturb the filter media 120. When the filter cell 100 is being backwashed the contaminants of the filter cell 100 flow into the trough 116 and out through open backwash waste valve 112. Water flows downward through the filter media 120 and a filter underdrain 122. From the underdrain 122, filtered water flows through filter influent turn-up loop 130 or other suitable flow controller and out to storage.

Filter effluent turn-up loop 130 includes a horizontal portion 132 extending inwardly of the filter cell 100 and an inverted u-shaped portion 134 extending upwardly from the horizontal portion 132. A filter effluent control valve 136 is positioned in the horizontal portion 132 to shut-off flow from the filter cell 100 when it is necessary to isolate the filter cell 100.

The inverted u-shaped portion of the effluent turn-up loop 134 maintains a corresponding minimum filter water level 138 when effluent is permitted to flow through a lower loop valve 140. When softening of the water is desired, lower loop valve 140 is closed so that effluent must pass through upper loop valve 142 which maintains a corresponding higher filter water level 144. This provides adequate detention and contact time for recarbonation prior to filtration. When used for this purpose, carbon dioxide or sulfuric acid is added at the filter cell influent conduit 80 through any appropriate feed valve. Other suitable filter effluent control means such as rate-of-flow controllers will also provide the desired results of maintaining proper levels of liquid in the filter cell.

Figure 3:
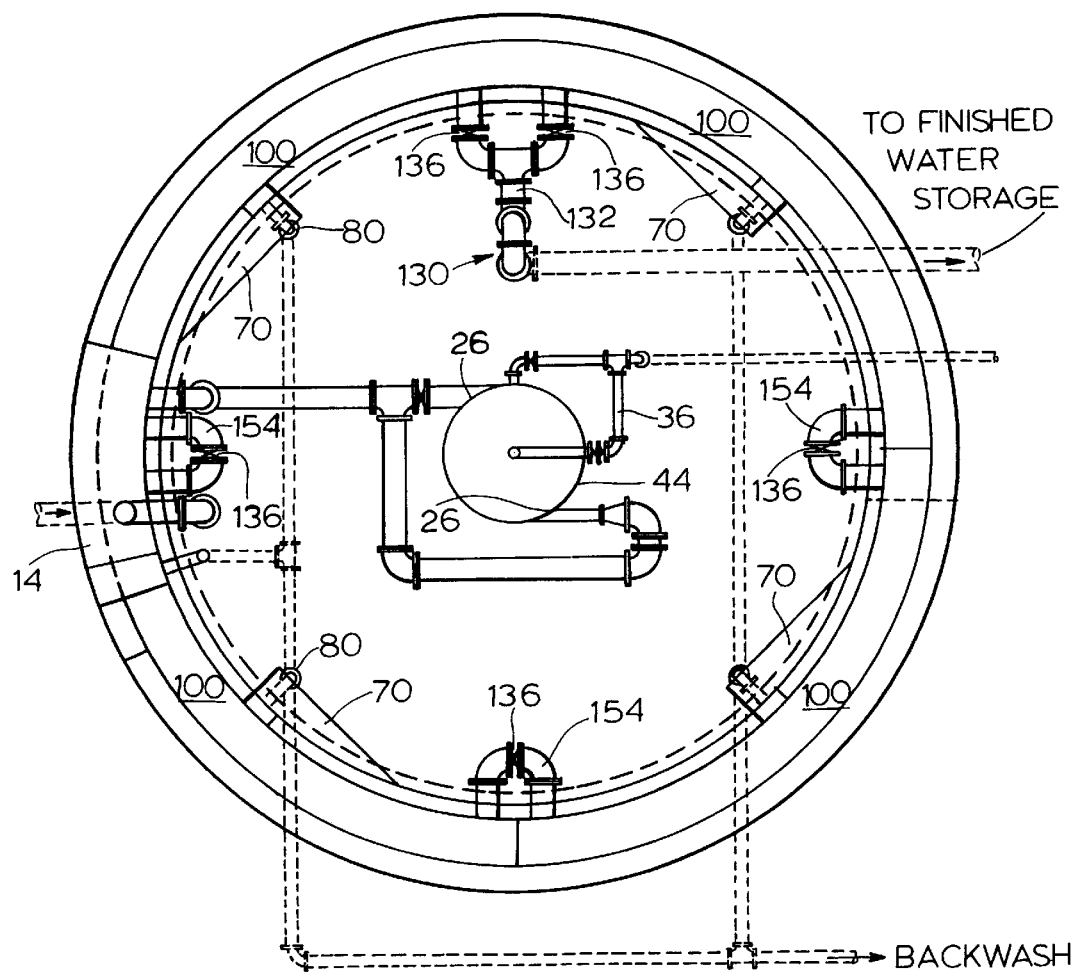
FIG. 3 is an alternative plan view of a treatment plant in accordance with the present invention.

As stated above, the underdrains 122 can be isolated by closing the filter effluent valves 136 two of which serve each filter cell 100. In normal filtering mode these valves are open and are interconnected with other underdrains by horizontal T-sections or U-shaped underdrain conduits 154 that, in effect, make the underdrains of all cells a single and common underdrain (FIGS. 2 and 3). In this manner, filtered water passes through the underdrains 122 and the underdrain conduits 154 to the effluent turn-up loop 130, and out of the plant effluent conduit 156. When the filter effluent for the entire plant is to be shut off, it is necessary only to close the lower and upper effluent control loop valves 140 and 142. Further, when it is desired to isolate a filter cell from the others for maintenance or backwashing, the two filter effluent control valves 136 on each side of its underdrain 122 are closed.

At the top of FIGS. 2 and 3 where the effluent turn-up loop 130 is illustrated, an extra filter effluent valve 136 is provided so that there is one on either side of the turn-up loop 130.

Filter-to-waste valves 148 illustrated in FIG. 2 drain water from an isolated filter cell to a waste conduit 158 to remove water of excessive turbidity such as when the filter cell is first isolated and for a short time after backwashing. The turbidity of the filter effluent is preferably measured in conduit 154 and linked to a valve controller to automatically return the cell to normal service. Between the filter-to-waste valve 148 and the waste conduit 158 there is provided a vertical air gap just above the waste conduit 158. This gap ensures that there will be no siphoning of waste water from the waste conduit 158 back up into the filter cell 100.

As illustrated on the right filter cell in FIG. 1, is a sight gauge 150 is provided for inspection of water level elevation within the filter cell 100.

Also as illustrated in FIG. 1, the four filter cells preferably define a piping room 170 beneath the vessel 20 which is typically 10 to 20 feet higher than other types of water treatment structures. Within this large space all of the piping for the treatment plant 10 can be maintained and access to the room is easy via a door 172 and stairs 174. Further, the domed cover 180 also eliminates the need for a filter building.

Unlike conventional four cell filter designs where the filters are at a distance from the clarifying vessel 20, the filter system of this invention can have four, six or more filter cells in order to reduce head requirements for filtering, backwash volume required per cell, and eliminate the need for auxiliary backwash sources. In fact, the height of the vessel 20 provides ample head and backwash water storage and possibly an excess of the required head and backwash storage. Further, underdrains 126 and individual filter cells can be isolated for maintenance and filter to waste.

In normal operation, all filter cells 100 are in a filtering mode. In this mode, raw water flows through the tray aerator/degasifier 12 and into the head tank 14. The head tank 14 feeds raw water conduit 16 with sufficient hydraulic head to drive the clarifier vessel 20 as described above. Treated and clarified liquid exits the clarifier vessel 20 through helical weirs 70 that are all positioned at the same elevation which to permit accurate and direct flow split and distribution to the filter cells without intermediate splitting devices. When the water level in a particular cell rises, it submerges the weir notch 70 and diverts water to other cells automatically.

Clarified water from the vessel 20 enters the top of the filter cell 100 and is filtered through the filter media 120 which is preferably sand and anthracite and out the underdrain 122. Loop valve 140 controls overall plant effluent flow rates and maintains a minimum filter water level 138 which prevents media exposure, negative head, and air binding. When the effluent turn-up loop 130 is used for water softening applications, a secondary or higher loop elevation 144 is maintained by closing lower valve 140 and opening upper valve 142 to raise the filter cell 100 water to the higher level 144 to provide adequate detention and contact time for recarbonation prior to filtration and storage in a recarbonation pool.

Filter cells 100 must be backwashed when they reach a terminal headloss (i.e. when the finished water turbidity approaches the potable drinking MCL limit of 0.5 NTU or the headloss through the filter approaches the predetermined maximum water level 182 in the filter cell.) This maximum level 182 is typically five feet above the invert of the elevation of the conduit at the upper or lower effluent loop valve 140 or 142, whichever is in use, when the plant is operated at 100% design capacity. When the plant is run at less than maximum capacity such as fifty percent, for example, the terminal headloss may be as little as eighteen inches above the loop valve depending on the application flow rate.

To backwash a filter cell 100 it must be isolated by closing filter influent valve 110 to stop the flow of clarified water and permit most of the water in the filter cell 100 to drain down to water level 138. The backwash waste valve 112 is opened to drain all the water in the water trough 116. Once drained, the two filter effluent valves 136 on each side of the filter cell are closed. During this procedure, filtered water is still flowing out of the plant 10 to storage because the other filter cells remain in operation and drain through their respective underdrains and out through the effluent turn-up loop 130.

Once the filter cell 100 and water trough 116 are drained, the overall plant effluent valve 140 or 142 is closed allowing the filter cells in service to store the required water volume to backwash. As the filters fill up, the dirtiest filter cell will fill up first because the water line elevation in that filter was higher than the other filter cells when the overall plant effluent valve was closed. When the dirtiest filter cell reaches the maximum waterline necessary for backwashing, its water line is at the same elevation as the top of the helical weir 70 feeding that cell. Since no more water can flow into this dirty cell, the water is then distributed to the other cells that are in service and the process continues in this manner until all of the cells are at the maximum level required for backwashing.

With all of the in-service filter cells filled, the filter effluent valves 136 on each side of the isolated filter cell are reopened to interconnect the filter underdrains of all the filter cells. The filter effluent control valves on the filter cell to be backwashed are throttled open (preferably by computer controls) to release the combined head of the in-service cells into the underdrain of the cell to be backwashed and provide a high pressure/low volume flow of water to fluidize the filter media and gradually increase to a high volume/low-pressure wash cycle averaging 20 minutes in duration as the in-service filter cells drain.

Once the in-service filter cells are drained to their normal operating levels, the overall plant effluent valve 140 or 142 is opened, and the backwashed filter cell is again isolated by closing the 136 valves. The filter media 120 in the backwashed filter cell re-stratifies and settles. The backwash waste valve 112 is then closed and the filter-to-waste valve 148 is opened to remove any solids which may have entered the underdrain 122 after backwashing until the turbidity of the filter effluent drops below acceptable levels. This completes the backwash cycle and the filter cell can now be returned to normal filtration mode by opening the effluent valves 136 and the other cells are monitored for headloss.

Figure 4:
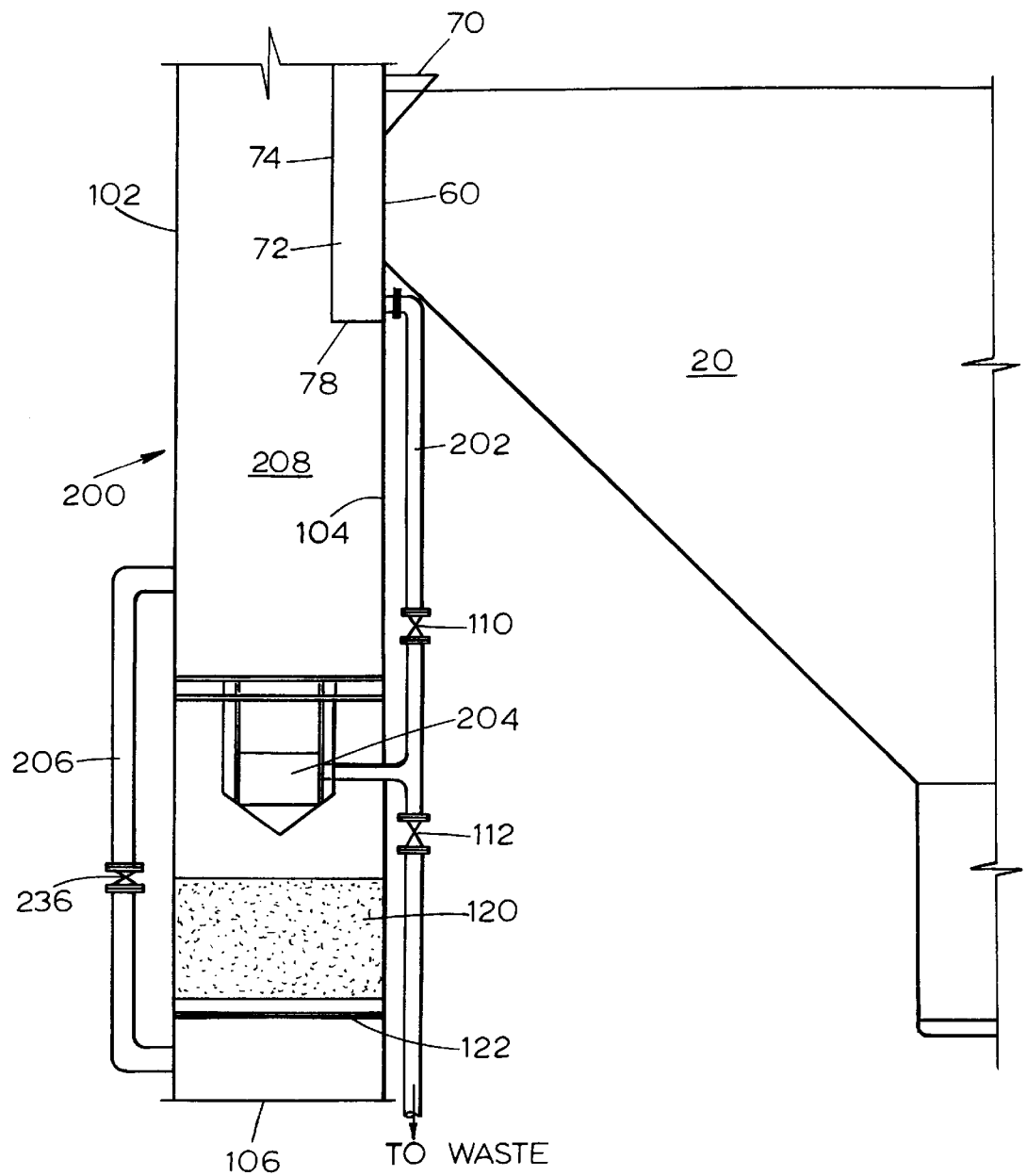
FIG. 4 is a cross-sectional elevation view of an alternative filter cell design in accordance with the present invention.

FIG. 4 illustrates an alternative embodiment for a filter cell 200 which receives clarified water from the clarification vessel 20 via pipe or conduit 202. Water passes through a suspended trough 204 and is filtered through media 120 as described above. Once filtered, the water is transferred through conduit 206 up to a water storage compartment 208 which is common to all filter cells 200. When a filter cell 200 is backwashed, it is isolated as before and water from the storage compartment 208 is transferred back through the filter media 120 via transfer conduit 206 and contaminants are removed through the suspended trough 204.

The foregoing detailed description has been given for clearness of understanding only, and no unnecessary limitations should be understood therefrom, as modifications will be obvious to those skilled in the art.

What is claimed is:

1. A method for backwashing a filter cell in a treatment plant having a central clarifying vessel and a plurality of filter cells at the periphery of the clarifying vessel, the method comprising:

isolating a filter cell to be backwashed from the clarifying vessel by taking the filter cell to be backwashed out of service;

transferring some liquid out of the isolated filter cell;

stopping flow of filter effluent from filter cells remaining in service;

filling the filter cells remaining in service with clarified liquid from the clarifying vessel until a surface level of liquid in the filter cells remaining in service reaches a predetermined elevation;

draining the filter cells remaining in service into the isolated filter cell to backwash filter media in the isolated filter cell;

withdrawing backwash filter contaminants from the isolated filter cell; and returning the filter cells to normal operation, the filter cells being in a filtering mode during normal operation.

2. The method of claim 1 for backwashing a filter cell in which the step of isolating a filter cell comprises:

closing a filter influent valve in a conduit between the clarifying vessel and the filter cell to be isolated.

3. The method of claim 1 for backwashing a filter cell in which the step of draining an isolated filter cell comprises:

opening a filter effluent valve while a filter influent valve to the isolated filter cell is closed.

4. The method of claim 1 for backwashing a filter cell in which the step of stopping the flow of filtered liquid effluent from the filter cells remaining in service comprises:

closing a filter effluent valve in a filtered liquid conduit leading from the treatment plant to a filtered water storage facilities.

5. The method of claim 1 for backwashing a filter cell in which the step of filling the filter cells remaining in service with clarified liquid comprises the steps of:

withdrawing liquid from the clarifying vessel; and draining the clarified liquid withdrawn from the clarifying vessel into the filter cells remaining in service.

6. The method of claim 1 for backwashing a filter cell in which the step of filling the filter cells remaining in service with clarified liquid from a clarifying vessel comprises:

withdrawing clarified liquid from the clarifying vessel through helical weirs, each filter cell receiving clarified liquid from at least one dedicated helical weir; and permitting the filter cells remaining in service to receive clarified liquid until the level of liquid in a filter cell submerges its dedicated helical weir and automatically diverts liquid to any helical weir that is not submerged.

7. The method of claim 1 and further comprising the step of:

recarbonating clarified liquid in the filter cells.

8. The method of claim 1 and further comprising the step of:

draining filtered water from the filter cells through a recarbonation turn-up loop.

* * * * *